United States Patent [19]
Corder

[11] Patent Number: 5,615,344
[45] Date of Patent: Mar. 25, 1997

[54] APPARATUS USED TO INTERFACE A PERIPHERAL DEVICE TO A COMPUTER EMPLOYING A RECONFIGURABLE INTERFACE CIRCUIT

[75] Inventor: Rodney J. Corder, Huntington Beach, Calif.

[73] Assignee: New Media Corp., Irvine, Calif.

[21] Appl. No.: 406,771

[22] Filed: Mar. 16, 1995

Related U.S. Application Data

[63] Continuation of Ser. No. 975,283, Nov. 12, 1992, abandoned.

[51] Int. Cl.$^6$ .................................................. G06F 13/00
[52] U.S. Cl. ........................... 395/309; 395/280; 395/882
[58] Field of Search ..................................... 395/325, 275, 395/309, 280, 882, 823, 828, 200.01, 500; 370/85.1; 340/825.06; 439/55

[56] References Cited

U.S. PATENT DOCUMENTS

| | | | |
|---|---|---|---|
| 3,828,326 | 8/1974 | Cash | 395/325 |
| 4,263,650 | 4/1981 | Bennett et al. | 395/275 |
| 4,443,850 | 4/1984 | Harris | 395/275 |
| 4,504,927 | 3/1985 | Callan | 395/275 |
| 4,589,063 | 5/1986 | Shah et al. | 395/275 |
| 4,941,089 | 7/1990 | Fischer | 395/325 |
| 4,991,085 | 2/1991 | Pleva et al. | 326/82 |
| 5,070,477 | 12/1991 | Latif et al. | 395/325 |
| 5,101,481 | 3/1992 | Anger et al. | 395/325 |
| 5,163,833 | 11/1992 | Olsen et al. | 439/61 |
| 5,179,628 | 1/1993 | Muranoi | 395/325 |
| 5,183,404 | 2/1993 | Aldons et al. | 439/55 |
| 5,187,645 | 2/1993 | Spalding et al. | 361/393 |
| 5,319,751 | 6/1994 | Garney | 395/650 |
| 5,319,754 | 6/1994 | Meinecke | 395/325 |
| 5,335,352 | 8/1994 | Yanai et al. | 395/800 |
| 5,338,210 | 8/1994 | Beckham et al. | 439/131 |
| 5,448,710 | 9/1995 | Liu | 395/497.03 |
| 5,455,572 | 10/1995 | Cannon et al. | 340/825.44 |
| 5,465,106 | 11/1995 | Keech et al. | 345/204 |
| 5,469,545 | 11/1995 | Vanbuskirk et al. | 295/200.01 |
| 5,519,851 | 5/1996 | Bender et al. | 395/500 |
| 5,533,202 | 7/1996 | Bione | 395/280 |
| 5,537,558 | 7/1996 | Fletcher et al. | 395/309 |

FOREIGN PATENT DOCUMENTS

| | | | |
|---|---|---|---|
| 0350573A1 | 1/1990 | European Pat. Off. | G06F 13/40 |
| 0490373A1 | 6/1992 | European Pat. Off. | G06F 13/40 |

OTHER PUBLICATIONS

Anon. "Smart" Cable for Enclosure/Connector, *IBM Technical Disclosure Bulletin*, vol. 33, No. 9, pp. 230–232 (Feb. 1991).

Xilinx Corp., "The Programmable Gate Array Data Book," pp. 2–1 to 2–26 (1991).

Kenneth K. Hillen et al, "Build Reconfigurable Peripheral Controllers," *Electronic Design* (Mar. 1990).

Kent Tallyn, "Reprogrammable Missile: How an FPGA Adds Flexibility to the Navy's Tomahawk," *Military & Aerospace electronics* (Apr. 1990).

*Primary Examiner*—Gopal C. Ray
*Attorney, Agent, or Firm*—Gregory Garmong

[57] ABSTRACT

An apparatus used to interface a peripheral device to a computer has an adapter card that plugs into the computer and a smart cable that plugs into the adapter card at one end and the peripheral device at the other. The adapter card includes a reconfigurable interface circuit that is in communication with the computer when the adapter card is connected to the computer. The smart cable includes a first memory containing configuration information for the reconfigurable interface circuit, and a second memory containing adapter card information structure information for the reconfigurable interface circuit. The two memories are accessible by the reconfigurable interface circuit when the smart cable is connected to the adapter card. The smart cable further includes a peripheral device interface circuit communicating with the reconfigurable interface circuit and with the peripheral device when the smart cable is connected to the adapter card and the peripheral device is connected to the smart cable. Connectors between the computer and the adapter card, the adapter card and the smart cable, and the smart cable and the peripheral device are also provided.

13 Claims, 3 Drawing Sheets

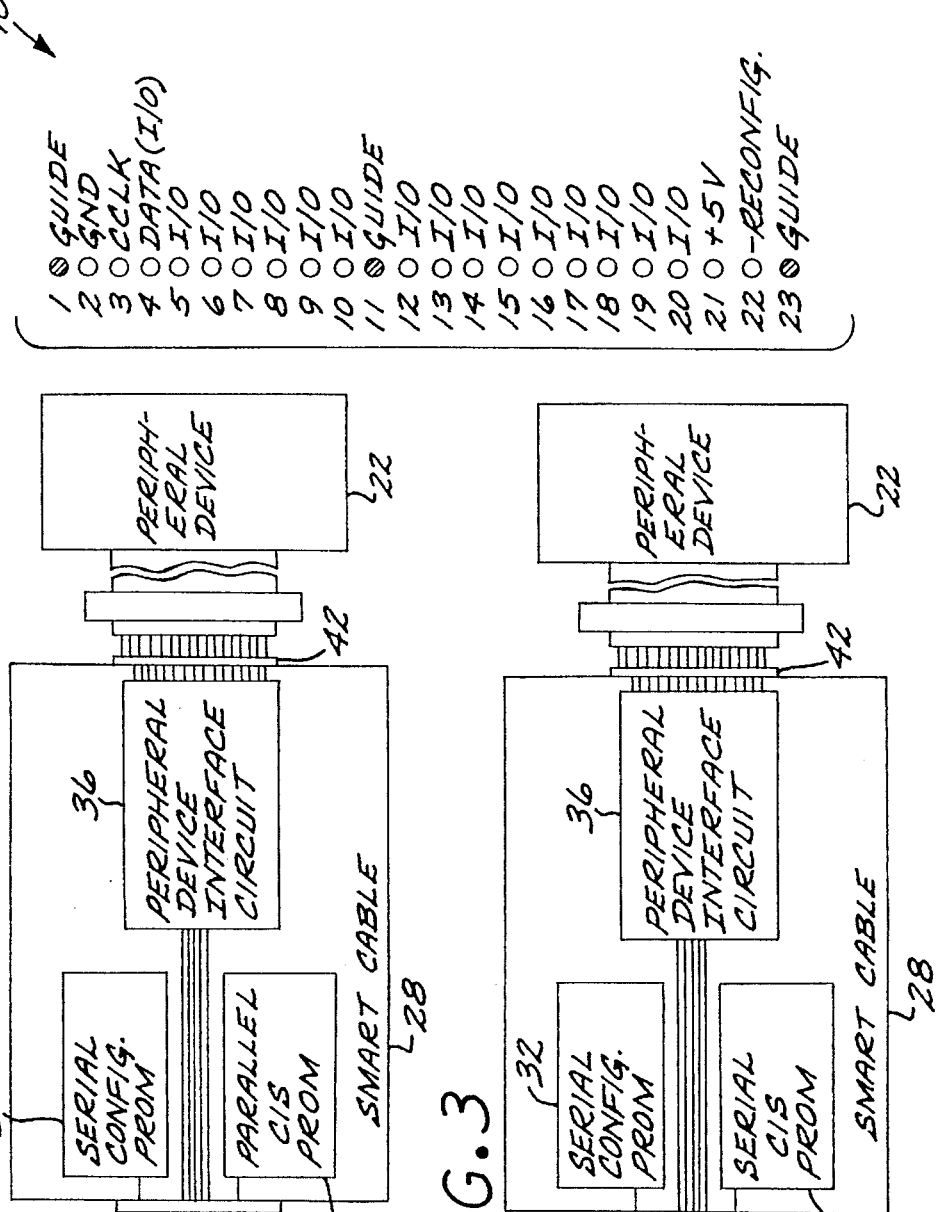

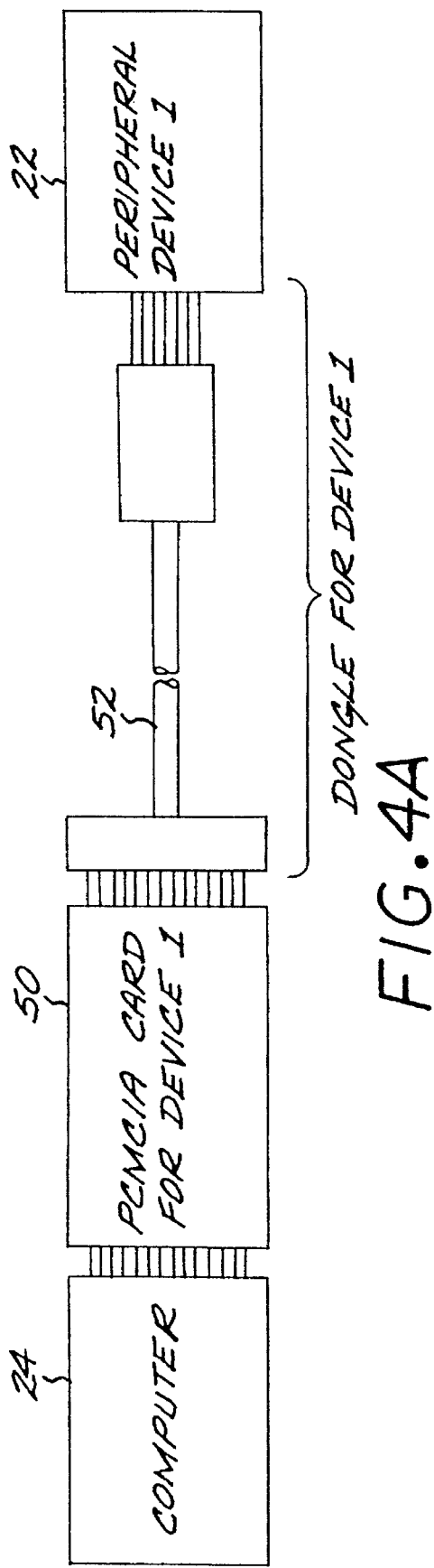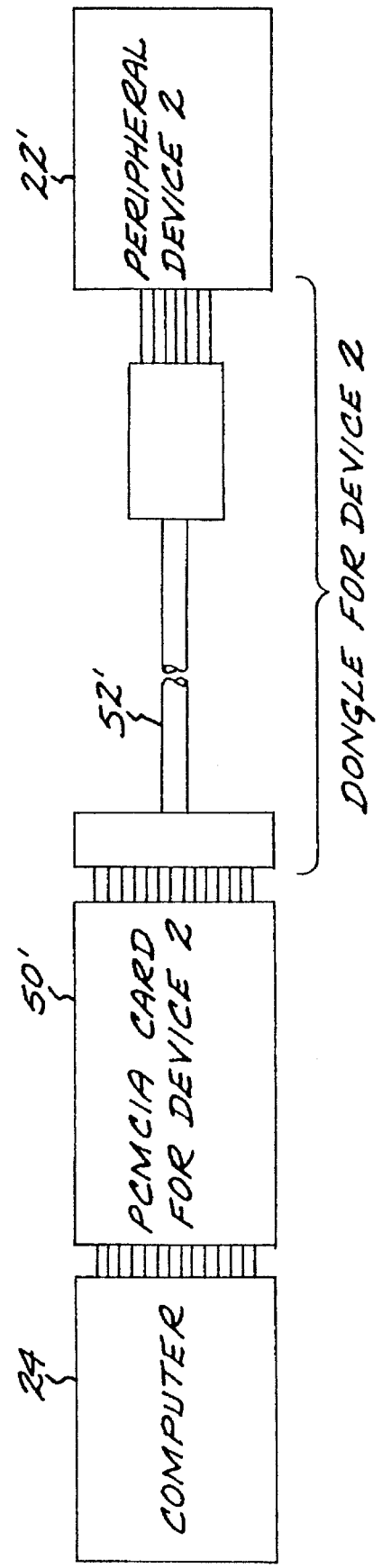

APPARATUS USED TO INTERFACE A PERIPHERAL DEVICE TO A COMPUTER EMPLOYING A RECONFIGURABLE INTERFACE CIRCUIT

This application is a continuation of application Ser. No. 07/975,283, filed Nov. 12, 1992, now abandoned.

BACKGROUND OF THE INVENTION

This invention relates to computer systems, and, more particularly, to the connection of peripheral devices to computers.

One of the important features of computers is their ability to connect to, exchange information with, and control (and be controlled by) various accessories. In some cases, accessories are internal to the computer. In other cases, due to size or other requirements, the accessories are external to the computer.

If the computer is a large desk-top type computer, many accessories may be provided within the body of the computer. If the computer is a portable computer such as laptop or notebook computer, some accessories must be furnished external to the computer because of their size, weight, and/or power requirements. Examples of such external accessories, termed "peripheral devices" herein, include modems for communicating through telephone lines with other computers, local area networks of two or more computers, and SCSI interfaces with machinery or devices.

The various types of peripheral devices typically utilize different connector structures, according to conventions established for each such device. According to the current conventions, modems use an RJ-11 connector, local area networks use an RJ-45 connector, and SCSI interfaces use a 50-pin Centronics connector. The selection of these different connectors is not arbitrary, but is made responsive to the requirements of the various peripheral devices.

In the conventional approach for interfacing a portable computer to such a peripheral device, a special-purpose PCMCIA card plugs into the computer. Since many of the integrated circuits required for peripheral interfaces are physically too large to reside inside the PCMCIA card, the interface is typically split into two pieces, the PCMCIA card itself and an outboard assembly, commonly termed a "dongle". The PCMCIA card contains a portion of the electronics required to interface the computer to the peripheral device, as well as the logic required to create an intermediate bus-like interface to communicate between the PCMCIA card and the dongle. The remaining interface electronics, as well as the interface to the intermediate bus, are placed in the dongle. The outboard assembly is usually in the form of a cable that plugs into the PCMCIA card at one end and the peripheral device at the other end. The PCMCIA card and the outboard assembly cable thus cooperate to interface the computer to the peripheral device, both electronically and physically by providing the required pin connector configurations. The PCMCIA card and the outboard assembly cable are special-purpose devices useful only with the peripheral device for which they are designed.

When the computer user wishes to add a peripheral device to the capability of the computer, the PCMCIA card and the outboard assembly cable are purchased along with the other structure and software of the peripheral device. In some instances, such as the modem, the cost of the dedicated PCMCIA card and the outboard assembly cable can constitute a significant portion of the total cost of the peripheral device. When the computer user adds another peripheral device to the computer capability, a separate dedicated PCMCIA card and outboard assembly cable specific to that device are purchased.

The present inventor has recognized a need for an improved approach to interfacing peripheral devices to computers, particularly portable computers. Such an interfacing approach would desirably reduce the cost of interfacing various types of peripheral devices to the computer, while managing the power requirements for the peripheral devices and the computer. The present invention fulfills this need, and further provides related advantages.

SUMMARY OF THE INVENTION

The present invention provides an interfacing architecture and associated apparatus for interfacing a computer to a peripheral device. The interface approach of the invention reduces the cost of obtaining interfaces between the computer and various peripheral devices. The approach also benefits manufacturers of peripheral devices, because the interface structures can be developed more rapidly and less expensively than in the prior approach. Power isolation between the computer and the peripheral device is improved, reducing the likelihood that power from the peripheral device can find its way into the computer.

In accordance with the invention, apparatus used to interface a peripheral device to a computer includes first means connectable to a computer for providing a reconfigurable interface circuit operable to reconfigure an interface bus according to flexibly defined signals between the computer and a peripheral device interface circuit. The apparatus further includes second means connectable to the first means and to the peripheral device for providing device-specific information to reconfigure the reconfigurable interface circuit of the first means and to provide the peripheral device interface circuit.

More specifically, apparatus used to interface a peripheral device to a computer comprises an adapter card including a reconfigurable interface circuit that is in communication with a computer when the adapter card is connected to the computer. There is an adapter card/computer connector configured to connect the adapter card to the computer. A portion of the adapter card/computer connector is in the computer and a portion of the adapter card/computer connector is in the adapter card. The apparatus further includes a smart cable having a first memory containing configuration information for the reconfigurable interface circuit. The first memory is accessible by the reconfigurable interface circuit when the smart cable is connected to the adapter card. There is a second memory containing adapter card information structure information for the reconfigurable interface circuit. The second memory is accessible by the reconfigurable interface circuit when the smart cable is connected to the adapter card. The apparatus further includes a peripheral device interface circuit communicating with the reconfigurable interface circuit and with the peripheral device when the smart cable is connected to the adapter card and the peripheral device is connected to the smart cable. The apparatus includes a smart cable/adapter card connector configured to connect the smart cable to the adapter card. A portion of the smart cable/adapter card connector is in the adapter card and a portion of the smart cable/adapter card connector is in the smart cable. A peripheral device/smart cable connector is configured to connect the peripheral device to the smart cable, with a portion of the peripheral device/smart cable connector being in the smart cable and a portion of the peripheral device/smart cable connector being in the peripheral device.

The adapter card and the smart cable are each aspects of the invention in their own right. Thus, apparatus used to interface a peripheral device to a computer comprises an adapter card including a reconfigurable interface circuit that is in communication with a computer when the adapter card is connected to the computer. There is an adapter card/computer connector configured to connect the adapter card to the computer, with a portion of the adapter card/computer connector being in the computer and a portion of the adapter card/computer connector being in the adapter card. The apparatus further includes a portion of a smart cable/adapter card connector configured to connect a smart cable to the adapter card.

Similarly, apparatus used to interface a peripheral device to a computer comprises a smart cable including a first memory containing configuration information for a reconfigurable interface circuit. The first memory is accessible by an external reconfigurable interface circuit when the smart cable is connected to the external reconfigurable interface circuit. There is a second memory containing adapter card information structure information for the external reconfigurable interface circuit. The second memory is accessible by the reconfigurable interface circuit when the smart cable is connected to the external reconfigurable interface circuit. The smart cable includes a peripheral device interface circuit communicating with the reconfigurable interface circuit and with a peripheral device when the smart cable is connected to the reconfigurable interface circuit and the peripheral device is connected to the smart cable. The smart cable further includes a portion of a smart cable/adapter card connector configured to connect the smart cable to an adapter card upon which the reconfigurable interface circuit resides, and a portion of a peripheral device/smart cable connector configured to connect the peripheral device to the smart cable.

The adapter card has a fixed hardware structure and a reconfigurable electronic structure. That is, the adapter card is supplied with a standard connector to the computer, preferably a 68-pin connect or for today's computers. It has a standard connector to the smart cable, preferably a 23-pin connector. It also has a reconfigurable interface circuit chip, preferably in the form of a programmable gate array (PGA). The programmable gate array can electronically reconfigure itself according to information supplied to it from memory, in this case the memories present in the smart cable. Thus, in a hardware sense the adapter card is a standard card that can be used, after appropriate electronic reconfiguration, with a wide variety of peripheral devices.

The smart cable, on the other hand, is configured specifically for a particular peripheral device. It has a connector to the adapter card, preferably the 23-pin connector, and a connector to the peripheral which will be specific to that peripheral (e.g., an RJ-11 connector for a modem, an RJ-45 connector for a local area network, or a 50-pin Centronics connector for a SCSI). The smart cable includes the memories whose contents are transferred to the adapter card to reconfigure the interface circuit chip. The smart cable also includes a peripheral device interface circuit that connects between the reconfigurable interface circuit chip of the adapter card and the peripheral device. Thus, all of the permanently device-specific aspects of the interface are found in the smart cable.

The approach of the invention is an important advance in the art of peripheral interfaces and has several distinct advantages over the prior approach. The adapter card is a standard card, so that the computer owner need purchase only one such card that is operable with a variety of peripheral devices. The separation of function and structure also benefits the manufacturer of peripheral devices. In conventional practice, when a new peripheral device is developed or sometimes when an existing peripheral device is improved, the manufacturer must design a completely new PCMCIA interface card. That process can be costly and slow, lengthening the time to introduction of new products and product improvements.

The present approach, by contrast, requires no design or redesign of the reconfigurable interface circuit. The manufacturer need only load the required reconfiguration information into the memories of the smart cable and, in the case of a new product, provide the peripheral device interface circuit to the smart cable. The present approach also offers technical advantages in terms of power isolation of the computer from the peripheral device. The adapter card typically has low power requirements, and can be powered from the computer. The smart cable and the peripheral device typically have higher power requirements, and are powered from an external power supply. The bus provides no power flow path from the external power supply to the computer, isolating the computer circuitry from external voltage levels that may differ from the internal voltage levels. The mixing of internal and external voltage levels within the computer can otherwise lead to internal failures of the computer.

Other features and advantages of the invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 1 is a schematic diagram of the preferred architecture of the computer/peripheral interface;

FIG. 2 is a pin configuration drawing for a preferred 23-pin bus connector between the adapter card and the smart cable;

FIG. 3 is a schematic diagram of another embodiment of the computer/peripheral interface;

FIG. 4 is a schematic drawing of a conventional computer/peripheral interface, with FIG. 4A depicting the interface for a first peripheral device and FIG. 4B depicting the interface for a second peripheral device.

DETAILED DESCRIPTION OF THE PREFERRED EMBODIMENTS

Figure 5A:
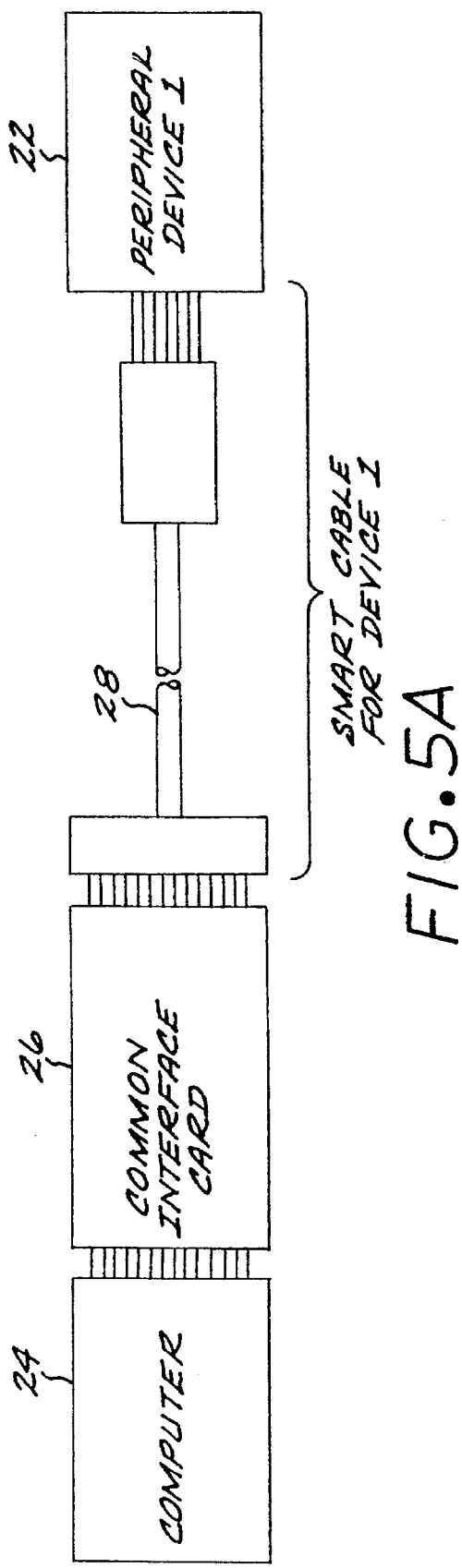
FIG. 5 is a schematic drawing of the present computer/peripheral interface, with FIG. 5A depicting the interface for a first peripheral device and FIG. 5B depicting the interface for a second peripheral device.

FIG. 1 illustrates, in block diagram form, a preferred apparatus 20 used to interface a peripheral device 22 to a computer 24. The apparatus 20 includes an adapter card 26 which connects to the computer 24, and a smart cable 28 which connects between the adapter card 26 and the peripheral device 22.

The adapter card 26 has mounted thereon a reconfigurable interface circuit 30. The reconfigurable interface circuit 30 is preferably a reconfigurable PCMCIA (Personal Computer Memory Card International Association) card, interface chip, or circuit, and is most preferably a programmable gate array (PGA) chip or circuit. Such a PGA chip is available commercially as the Xilinx Programmable Gate Array Model XC8042. Briefly, the PGA circuit comprises a plurality of programmable gates, and the capability to automatically program or reconfigure the electronic circuitry of those gates utilizing information stored in accessible memories, upon command or powering of the chip. In effect, the circuit 30 acts as a programmable array of switches and other devices that serve to interconnect specified pins of the connectors, specify the speed of the interface, identify which signals of the connectors serve as input, output, etc., and other programmable functions. All of the reconfigurable functions of the apparatus 20 are accomplished by the reconfigurable interface circuit using specified configurations to be supplied in the manner described next.

The smart cable 28 has mounted thereon a first memory 32 containing configuration information for initially reconfiguring the reconfigurable interface circuit 30. This configuration information defines the bus interface, defines address decoding, provides the types of accessible cycles, provides the protocol for connection to the peripheral device interface circuit 36, and provides the logic for accomplishing these functions. The memory 32 is preferably a PROM (programmable read-only memory), and is most preferably a serially configured PROM. A serial PROM operable with the Xilinx reconfigurable interface circuit 30 is available as the Xilinx XC1765 serial configuration PROM. When the reconfigurable interface circuit 30 is powered, or otherwise commanded, it accesses the first memory 32 to obtain initial configuration information that causes the gates in the PGA circuit to reconfigure according to the contents of the first memory 32.

The smart cable 28 further has mounted thereon a second memory 34 containing card information structure (CIS) information that is used by the host computer 24 to interact with the peripheral device 22. Information such as the type of device, address mapping, interrupt capability, how to program any programmable memory, and also the access time information is provided by the second memory 34 to the computer 24, through the programmable gate array of the reconfigurable interface circuit 30 as previously configured by reference to the first memory 32. That is, the information of the second memory 34 is not transmitted to the computer 24 until the reconfigurable interface circuit 30 has been configured properly for the particular peripheral device 22.

The first memory 32 and the second memory 34 may be provided on the same memory chip, but their functions are distinct. The first memory 32 contains information to initially configure or reconfigure the reconfigurable interface circuit 30. It is normally accessed by the reconfigurable interface circuit 30 only once, prior to any communication between the computer 24 and the peripheral device 22. The second memory 34 contains information that is repeatedly accessed by the computer 24 during communication with the peripheral device 22, and acts in the manner of an extension of the computer's memory as specifically related to the peripheral device. Faster access to the second memory 34 than to the first memory 32 is therefore required in most instances. The second memory 34 is preferably a parallel-configured PROM, such as an AMD AM27C64 one-time programmable memory.

The smart cable 28 further includes a peripheral device Interface circuit 36 that communicates between the reconfigurable interface circuit and the peripheral device 22. The peripheral device interface circuit 36 is a standard circuit or chip for the peripheral device 22. Thus, for example, the circuit 36 may be a Rockwell 224ATF for a modem, a National Semiconductor ST-NiC chip for a local area network, or an Adaptec AIC-6260 chip for SCSI interface. These circuits are routinely provided by semiconductor manufacturers to drive various standard peripheral devices 22. Such a peripheral device interface circuit 36 requires particular inputs, outputs, timing signals, and other information to and from the computer 24. The nature and locations of the chip inputs and outputs and the necessary interface reconfiguration are stored in the memories 32 and 34 for use in the manner previously discussed.

The adapter card 26 (and thence the reconfigurable interface circuit 30) is connected to the computer 24 with an adapter card/computer connector 38. The nature of this connector is dictated by the port configuration of the computer 24. In the preferred form of the invention, the adapter card 26 is connected to the PCMCIA socket of the computer. In currently available portable computers, the PCMCIA socket normally has a 68-pin connector, and therefore the connector 38 is a 68-pin connector. A portion of the connector 38 (either the male or the female portion) is located in the computer 24, and the other portion is located in the adapter card 26 for quick connection and disconnection of the adapter card 26 and the computer 24.

The smart cable 28 (and thence the memories 32 and 34 and the peripheral device interface circuit 36) is connected to the adapter card 26 (and thence the reconfigurable interface circuit 30) by a smart cable/adapter card connector 40. This connector 40 is preferably a 23-pin connector configured as shown in FIG. 2. Three pin locations are used as guide pins, five pins have predefined functions (ground, clock, data, voltage, reconfiguration command), and the remaining pins (labelled I/O) are fully programmable according to the configuration established in the programming of the reconfigurable interface circuit 30. These programmable pins are not programmed arbitrarily, but are programmed according to the input/output requirements of the peripheral device interface circuit 36. These requirements and pin assignments are stored in the first memory 32 and serve as part of the information that is used to initially reconfigure the circuit 30. Thus, they cannot be specified herein in any general sense, as their function will vary according to the specific peripheral device for which the interface apparatus 20 is configured.

The peripheral device 22 is connected to the smart cable 28 (and thence the peripheral device interface circuit by a peripheral device/smart cable connector 42. This connector will be of any type required by the peripheral device. As discussed earlier, examples include an RJ-11 connector for a modem, an RJ-45 connector for a local area network, or a 50-pin Centronics connector for a SCSI interface.

An alternative structure of the apparatus 20 is illustrated in FIG. 3. Here, the majority of the components are identical to those shown in FIG. 1, and are numbered identically. These components function as previously described, except as next discussed. The apparatus 20 of FIG. 3 substitutes a slower serial CIS PROM for the parallel CIS PROM of the second memory 34. To compensate for the slower access times for information transferred from the second memory 34 to the computer 24 inherent in this arrangement, a random access memory (RAM) 44 is added to the adapter card 26. During the initial configuration, the information in the second memory 34 is transferred to the random access memory 44 on the adapter card 26. The memory 44 is accessible by the reconfigurable interface circuit 30, which is configured to supply from the memory 44 the information originally found in the second memory 34. The access of the computer 24 to the information in the second memory 34 is therefore not slowed by the serial nature of the second memory 34. In addition, the unused portion of the RAM 44 may be used for other purposes as defined by the configuration of the reconfigurable interface circuit 30, the program or device driver of the computer 24, and the functionality of the peripheral device integrated circuit 36. These other uses include a FIFO buffer between the computer 24 and the peripheral device interface circuit 36, a DMA buffer for the peripheral device interface circuit 25, or a scratch-pad memory for the computer 24.

The principal functional differences between the prior conventional approach and the present approach are depicted in FIGS. 4 and 5. FIG. 4, the conventional approach, shows a device-specific PCMCIA card 50 that is plugged into the computer 24. (The term "device-specific" means that the structure can be used only with a specific type of peripheral device, and not with other peripheral devices.) A device-specific cable 52 (i.e., a dongle) with outboard electronics assembly is connected at one end to the card 50 and at the other end to the peripheral device 22. In FIG. 4A, a particular peripheral device 22 is used, and device-specific cards 50 and cable 52 are required. If another peripheral device 22' is substituted for the peripheral device 24, as shown in FIG. 4B, then an entirely new device-specific PCMCIA card 50' and device-specific cable 52' must be obtained and used.

Figure 5B:
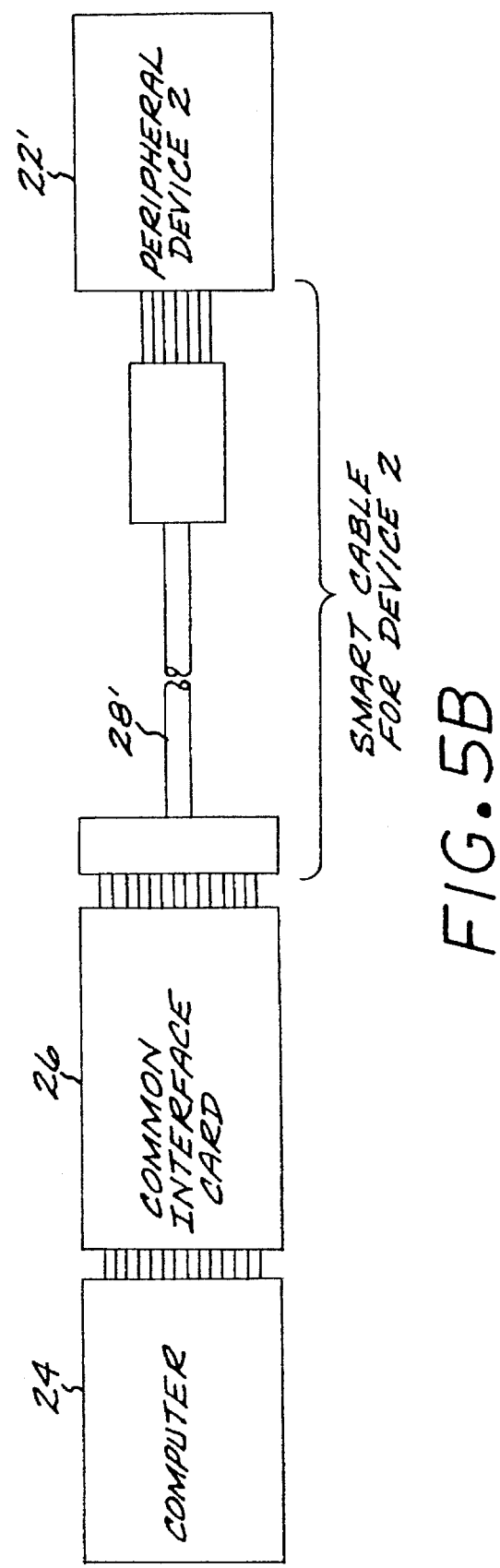

By contrast, the present approach is shown in FIG. 5. A single, common (universal) adapter card 26 is plugged into the computer 24, regardless of whether the peripheral device 22 (FIG. 5A) or the peripheral device 22' (FIG. 5B) is selected. Only the smart cable 28 is changed. A first device-specific smart cable 28 is supplied and used for the peripheral device 24 (FIG. 5A) and a second device-specific smart cable 28' is supplied and used for the peripheral device 24' (FIG. 5B).

The increased commonality and reduced cost of a universal adapter card 26 operable with all peripheral devices is apparent. If the user has more than one peripheral device, the total product cost is reduced because only one adapter card need be purchased. Other associated advantages of the present approach over the prior approach are less apparent but equally important. The manufacturers of peripheral devices need not design a new device-specific card 50 for each new product or product improvement. The adapter card remains physically unchanged, but the reconfigurable interface circuit is reconfigured for each peripheral device or modification by providing different information in the memories 32 and 34. Providing this information in memory is a less complex, less costly, and more quickly accomplished task than redesigning and debugging a new device-specific PCMCIA card 50 for each new product. Thus, product development costs of the manufacturer are reduced, and product introduction or upgrade times are reduced.

The present approach also more effectively isolates the internal circuitry of the computer from the internal circuitry of the peripheral device and its peripheral device interface circuit. In some instances, the peripheral devices and their peripheral device interface circuits require more power than a portable computer can reasonably provide without excessive battery drain. The power to operate the peripheral device and its interfacing circuitry must be provided by an external power supply. If the voltages in the external power supply are introduced into the circuitry within the computer, the computer circuitry may be damaged, or operations may be disrupted. The prior architecture of FIG. 4, with the card 50 directly connected to the computer through the 68-pin connector, may result in such leakage of voltage levels of the external power supply into the internal circuitry of the computer. In the present approach, however, the smart cable/adapter card connector 40 and the reconfigurable interface circuit 30 effectively isolate voltages of an external power supply from the computer Although a particular embodiment of the invention has been described in detail for purposes of illustration, various modifications may be made without departing from the spirit and scope of the invention. Accordingly, the invention is not to be limited except as by the appended claims.

What is claimed is:

1. An apparatus for interfacing a peripheral device having a peripheral device hardware interfacing requirement to a computer, comprising:

an adapter card including a reconfigurable interface circuit that is in communication with a computer when the adapter card is connected to the computer, the reconfigurable interface circuit including an electronic circuit whose circuit structure is reconfigurable to the peripheral device hardware interfacing requirement according to information provided to the reconfigurable interface circuit, wherein the reconfigurable interface circuit is a reconfigurable PCMCIA interface chip;

an adapter card/computer external connector configured to connect the adapter card to the computer, a portion of the adapter card/computer external connector being in the computer and a portion of the adapter card/ computer external connector being in the adapter card;

a smart cable including
a first memory containing configuration information for the reconfigurable interface circuit, the first memory being accessible by the reconfigurable interface circuit when the smart cable is connected to the adapter card,
a second memory containing adapter card information structure information for the reconfigurable interface circuit, the second memory being accessible by the reconfigurable interface circuit when the smart cable is connected to the adapter card, and
a peripheral device interface circuit communicating with the reconfigurable interface circuit and with the peripheral device when the smart cable is connected to the adapter card and the peripheral device is connected to the smart cable;

a smart cable/adapter card connector configured to connect the smart cable to the adapter card, a portion of the smart cable/adapter card connector being in the adapter card and a portion of the smart cable/adapter card connector being in the smart cable; and a peripheral device/smart cable connector configured to connect the peripheral device to the smart cable, a portion of the peripheral device/smart cable connector being in the smart cable and a portion of the peripheral device/smart cable connector being in the peripheral device.

2. An apparatus for interfacing a peripheral device having a peripheral device hardware interfacing requirement to a computer, comprising:

an adapter card including a reconfigurable interface circuit that is in communication with a computer when the adapter card is connected to the computer, the reconfigurable interface circuit including an electronic circuit whose hardware structure is reconfigurable to the peripheral device hardware interfacing requirement according to information provided to the reconfigurable interface circuit;

an adapter card/computer external connector configured to connect the adapter card to the computer, a portion of the adapter card/computer external connector being in the computer and a portion of the adapter card/computer external connector being in the adapter card, wherein the adapter card/computer external connector is a 68-pin connector;

a smart cable including a first memory containing configuration information for the reconfigurable interface circuit, the first memory being accessible by the reconfigurable interface circuit when the smart cable is connected to the adapter card, a second memory containing adapter card information structure information for the reconfigurable interface circuit, the second memory being accessible by the reconfigurable interface circuit when the smart cable is connected to the adapter card, and a peripheral device interface circuit communicating with the reconfigurable interface circuit and with the peripheral device when the smart cable is connected to the adapter card and the peripheral device is connected to the smart cable;

a smart cable/adapter card connector configured to connect the smart cable to the adapter card, a portion of the smart cable/adapter card connector being in the adapter card and a portion of the smart cable/adapter card connector being in the smart cable; and a peripheral device/smart cable connector configured to connect the peripheral device to the smart cable, a portion of the peripheral device/smart cable connector being in the smart cable and a portion of the peripheral device/smart cable connector being in the peripheral device.

3. An apparatus for interfacing a peripheral device having a peripheral device hardware interfacing requirement to a computer, comprising:

an adapter card including a reconfigurable interface circuit that is in communication with a computer when the adapter card is connected to the computer, the reconfigurable interface circuit including an electronic circuit whose hardware structure is reconfigurable to the peripheral device hardware interfacing requirement according to information provided to the reconfigurable interface circuit;

an adapter card/computer external connector configured to connect the adapter card to the computer, a portion of the adapter card/computer external connector being in the computer and a portion of the adapter card computer external connector being in the adapter card;

a smart cable including a first memory containing configuration information for the reconfigurable interface circuit, the first memory being accessible by the reconfigurable interface circuit when the smart cable is connected to the adapter card, wherein the first memory is a serial-configuration memory, a second memory containing adapter card information structure information for the reconfigurable interface circuit, the second memory being accessible by the reconfigurable interface circuit when the smart cable is connected to the adapter card, and a peripheral device interface circuit communicating with the reconfigurable interface circuit and with the peripheral device when the smart cable is connected to the adapter card and the peripheral device is connected to the smart cable;

a smart cable/adapter card connector configured to connect the smart cable to the adapter card, a portion of the smart cable/adapter card connector being in the adapter card and a portion of the smart cable/adapter card connector being in the smart cable; and a peripheral device/smart cable connector configured to connect the peripheral device to the smart cable, a portion of the peripheral device/smart cable connector being in the smart cable and a portion of the peripheral device/smart cable connector being in the peripheral device.

4. An apparatus for interfacing a peripheral device having a peripheral device hardware interfacing requirement to a computer, comprising:

an adapter card including a reconfigurable interface circuit that is in communication with a computer when the adapter card is connected to the computer, the reconfigurable interface circuit including an electronic circuit whose hardware structure is reconfigurable to the peripheral device hardware interfacing requirement according to information provided to the reconfigurable interface circuit;

an adapter card/computer external connector configured to connect the adapter card to the computer, a portion of the adapter card/computer external connector being in the computer and a portion of the adapter card/computer external connector being in the adapter card;

a smart cable including a first memory containing configuration information for the reconfigurable interface circuit, the first memory being accessible by the. reconfigurable Interface circuit when the smart cable is connected to the adapter card, a second memory containing adapter card information structure information for the reconfigurable interface circuit, the second memory being accessible by the reconfigurable interface circuit when the smart cable is connected to the adapter card, wherein the second memory is a serial-configuration memory, and a peripheral device interface circuit communicating with the reconfigurable interface circuit and with the peripheral device when the smart cable is connected to the adapter card and the peripheral device is connected to the smart cable;

a smart cable/adapter card connector configured to connect the smart cable to the adapter card, a portion of the smart cable/adapter card connector being in the adapter card and a portion of the smart cable/adapter card connector being in the smart cable; and a peripheral device/smart cable connector configured to connect the peripheral device to the smart cable, a portion of the peripheral device/smart cable connector being in the smart cable and a portion of the peripheral device/smart cable connector being in the peripheral device.

5. An apparatus for interfacing a peripheral device having a peripheral device hardware interfacing requirement to a computer, comprising:

an adapter card including a reconfigurable interface circuit that is in communication with a computer when the adapter card is connected to the computer, the reconfigurable interface circuit including an electronic circuit whose hardware structure is reconfigurable to the peripheral device hardware interfacing requirement according to information provided to the reconfigurable interface circuit;

an adapter card/computer external connector configured to connect the adapter card to the computer, a portion of the adapter card/computer external connector being in the computer and a portion of the adapter card/computer external connector being in the adapter card;

a smart cable including a first memory containing configuration information for the reconfigurable interface circuit, the first memory being accessible by the reconfigurable interface circuit when the smart cable is connected to the adapter card, second memory containing adapter card information structure information for the reconfigurable interface circuit, the second memory being accessible by the reconfigurable interface circuit when the smart cable is connected to the adapter card, and a peripheral device interface circuit communicating with the reconfigurable interface circuit and with the peripheral device when the smart cable is connected to the adapter card and the peripheral device is connected to the smart cable;

a smart cable/adapter card connector configured to connect the smart cable to the adapter card, a portion of the smart cable/adapter card connector being in the adapter card and a portion of the smart cable/adapter card connector being in the smart cable, where in the smart cable/adapter card connector is a 23-pin connector; and a peripheral device/smart cable connector configured to connect the peripheral device to the smart cable, a portion of the peripheral device/smart cable connector being in the smart cable and a portion of the peripheral device/smart cable connector being in the peripheral device.

6. An apparatus for interfacing a peripheral device having a peripheral device hardware interfacing requirement to a computer, comprising an adapter card including a reconfigurable interface circuit that is in communication with a computer when the adapter card is connected to the computer, the reconfigurable interface circuit including an electronic circuit that is reconfigurable to the peripheral device hardware interfacing requirement according to information provided to the reconfigurable interface circuit from a memory located external to the apparatus, wherein the reconfigurable interface circuit is a reconfigurable PCMCIA interface chip;

a portion of an adapter card/computer connector configured to connect the adapter card to the computer, the portion of the adapter card/computer connector being supported on the adapter card and being electrically connected to the reconfigurable interface circuit; and a portion of a smart cable/adapter card connector configured to connect a smart cable to the adapter card, the portion of the smart cable/adapter card connector being supported on the adapter card and being electrically connected to the reconfigurable interface circuit.

7. The apparatus of claim 6, wherein the memory located external to the apparatus is located on the smart cable.

8. An apparatus for interfacing a peripheral device having a peripheral device hardware interfacing requirement to a computer, comprising an adapter card including a reconfigurable interface circuit that is in communication with a computer when the adapter card is connected to the computer, the reconfigurable interface circuit including an electronic circuit that is reconfigurable to the peripheral device hardware interfacing requirement according to information provided to the reconfigurable interface circuit from a memory located external to the apparatus;

a portion of an adapter card/computer connector configured to connect the adapter card to the computer, the portion of the adapter card/computer connector being supported on the adapter card and being electrically connected to the reconfigurable interface circuit, wherein the adapter card/computer connector is a 68-pin connector; and a portion of a smart cable/adapter card connector configured to connect a smart cable to the adapter card, the portion of the smart cable/adapter card connector being supported on the adapter card and being electrically connected to the reconfigurable interface circuit.

9. The apparatus of claim 8, wherein the memory located external to the apparatus is located on the smart cable.

10. An apparatus for interfacing a peripheral device having a peripheral device hardware interfacing requirement to a computer, comprising a smart cable including a first memory containing configuration information for a reconfigurable interface circuit, the first memory being accessible by an external reconfigurable interface circuit when the smart cable is connected to the external reconfigurable interface circuit, the reconfigurable interface circuit including an electronic circuit that is reconfigurable to the peripheral device hardware interfacing requirement according to information provided to the reconfigurable interface circuit, wherein the first memory is a serial-configuration memory;

a second memory containing adapter card information structure information for the external reconfigurable interface circuit, the second memory being accessible by the reconfigurable interface circuit when the smart cable is connected to the external reconfigurable interface circuit;

a peripheral device interface circuit communicating with the reconfigurable interface circuit and with a peripheral device when the smart cable is connected to the reconfigurable interface circuit and the peripheral device is connected to the smart cable;

a portion of a smart cable/adapter card connector configured to connect the smart cable to an adapter card upon which the reconfigurable interface circuit resides; and a portion of a peripheral device/smart cable connector configured to connect the peripheral device to the smart cable.

11. An apparatus for interfacing peripheral device having a peripheral device hardware interfacing requirement to a computer, comprising a smart cable including a first memory containing configuration information for a reconfigurable interface circuit, the first memory being accessible by an external reconfigurable interface circuit when the smart cable is connected to the external reconfigurable interface circuit, the reconfigurable interface circuit including an electronic circuit that is reconfigurable to the peripheral device hardware interfacing requirement according to information provided to the reconfigurable interface circuit;

a second memory containing adapter card information structure information for the external reconfigurable interface circuit, the second memory being accessible by the reconfigurable interface circuit when the smart cable is connected to the external reconfigurable interface circuit, wherein the second memory is a serial-configuration memory;

a peripheral device interface circuit communicating with the reconfigurable interface circuit and with a peripheral device when the smart cable is connected to the reconfigurable interface circuit and the peripheral device is connected to the smart cable;

a portion of a smart cable/adapter card connector configured to connect the smart cable to an adapter card upon which the reconfigurable interface circuit resides; and a portion of a peripheral device/smart cable connector configured to connect the peripheral device to the smart cable.

12. An apparatus for interfacing a peripheral device having a peripheral device hardware interfacing requirement to a computer, comprising a smart cable including a first memory containing configuration information for a reconfigurable interface circuit, the first memory being accessible by an external reconfigurable interface circuit when the smart cable is connected to the external reconfigurable interface circuit, the reconfigurable interface circuit including an electronic circuit that is reconfigurable to the peripheral device hardware interfacing requirement according to information provided to the reconfigurable interface circuit;

a second memory containing adapter card information structure information for the external reconfigurable interface circuit, the second memory being accessible by the reconfigurable interface circuit when the smart cable is connected to the external reconfigurable interface circuit, wherein the first memory and the second memory are contained in a single memory device;

a peripheral device interface circuit communicating with the reconfigurable interface circuit and with a peripheral device when the smart cable is connected to the reconfigurable interface circuit and the peripheral device is connected to the smart cable;

a portion of a smart cable/adapter card connector configured to connect the smart cable to an adapter card upon which the reconfigurable interface circuit resides; and a portion of a peripheral device/smart cable connector configured to connect the peripheral device to the smart cable.

13. An apparatus for interfacing a peripheral device having a peripheral device hardware interfacing requirement to a computer, comprising a smart cable including a first memory containing configuration information for a reconfigurable interface circuit, the first memory being accessible by an external reconfigurable interface circuit when the smart cable is connected to the external reconfigurable interface circuit, the reconfigurable interface circuit including an electronic circuit that is reconfigurable to the peripheral device hardware interfacing requirement according to information provided to the reconfigurable interface circuit;

a second memory containing adapter card information structure information for the external reconfigurable interface circuit, the second memory being accessible by the reconfigurable interface circuit when the smart cable i s connected to the external reconfigurable interface circuit;

a peripheral device interface circuit communicating with the reconfigurable interface circuit and with a peripheral device when the smart cable is connected to the reconfigurable interface circuit and the peripheral device is connected to the smart cable;

portion of a smart cable/adapter card connector configured to connect the smart cable to an adapter card upon which the reconfigurable interface circuit resides, wherein the smart cable/adapter card connector is a 23-pin connector; and a portion of a peripheral device/smart cable connector configured to connect the peripheral device to the smart cable.

* * * * *